Figure 8:
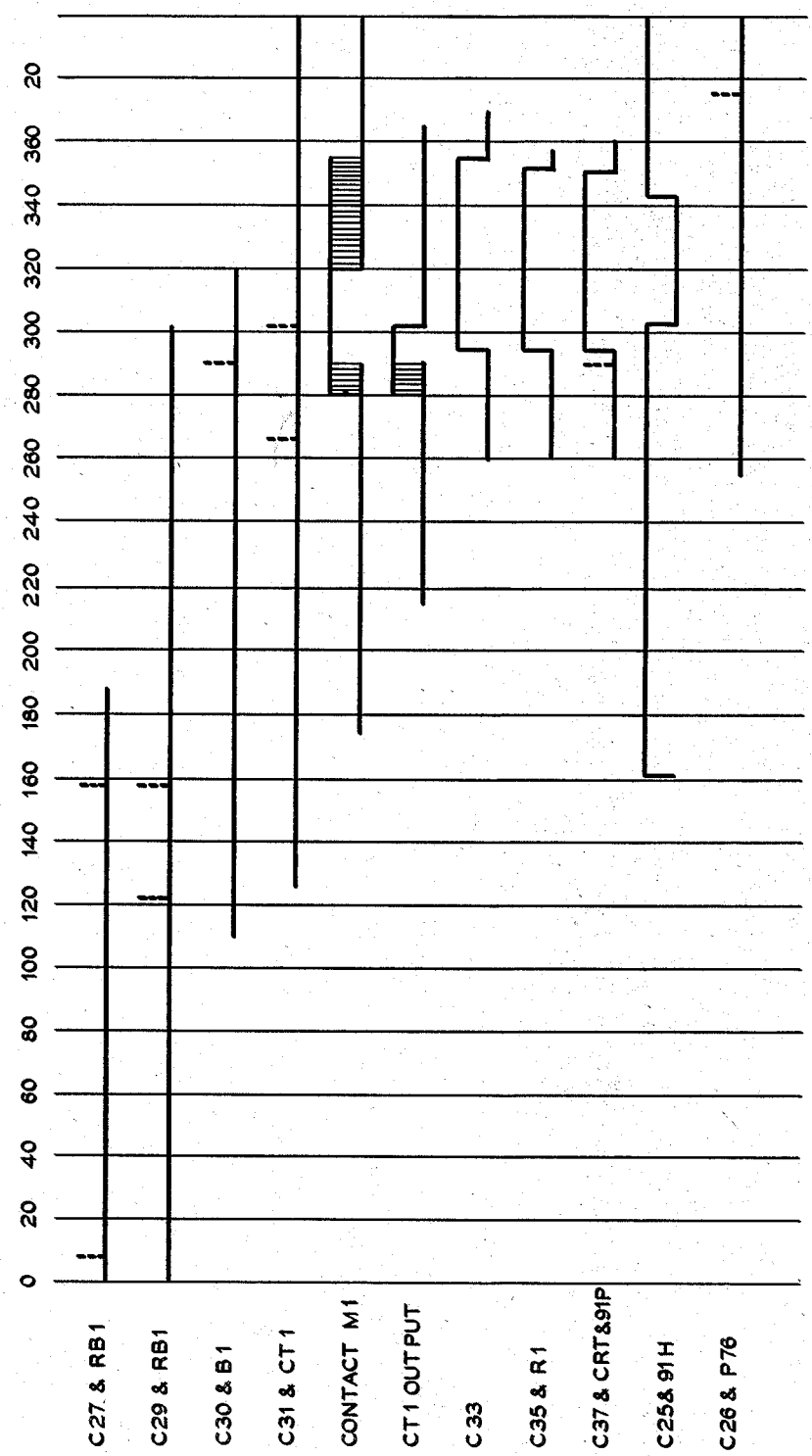

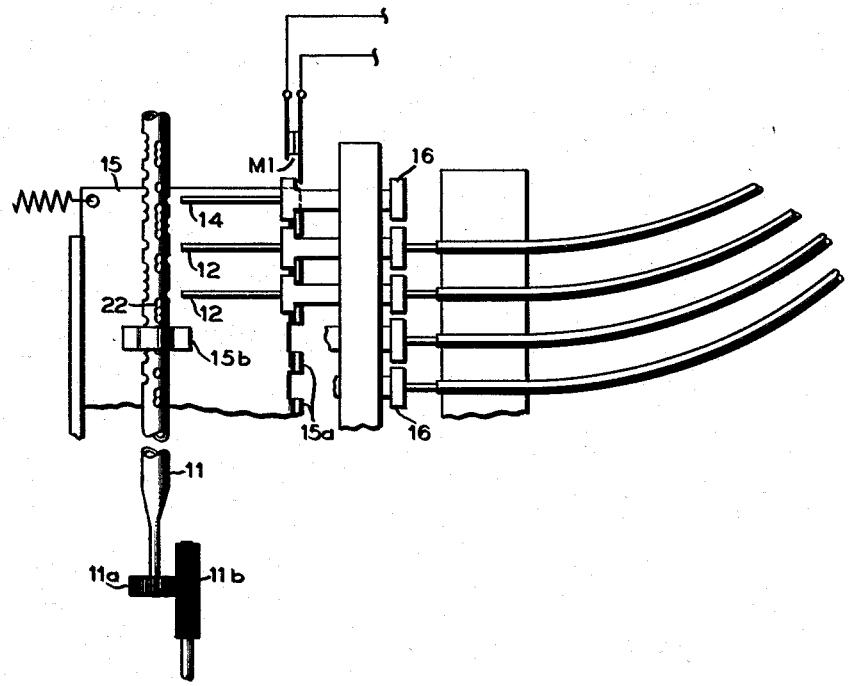
FIG_1_

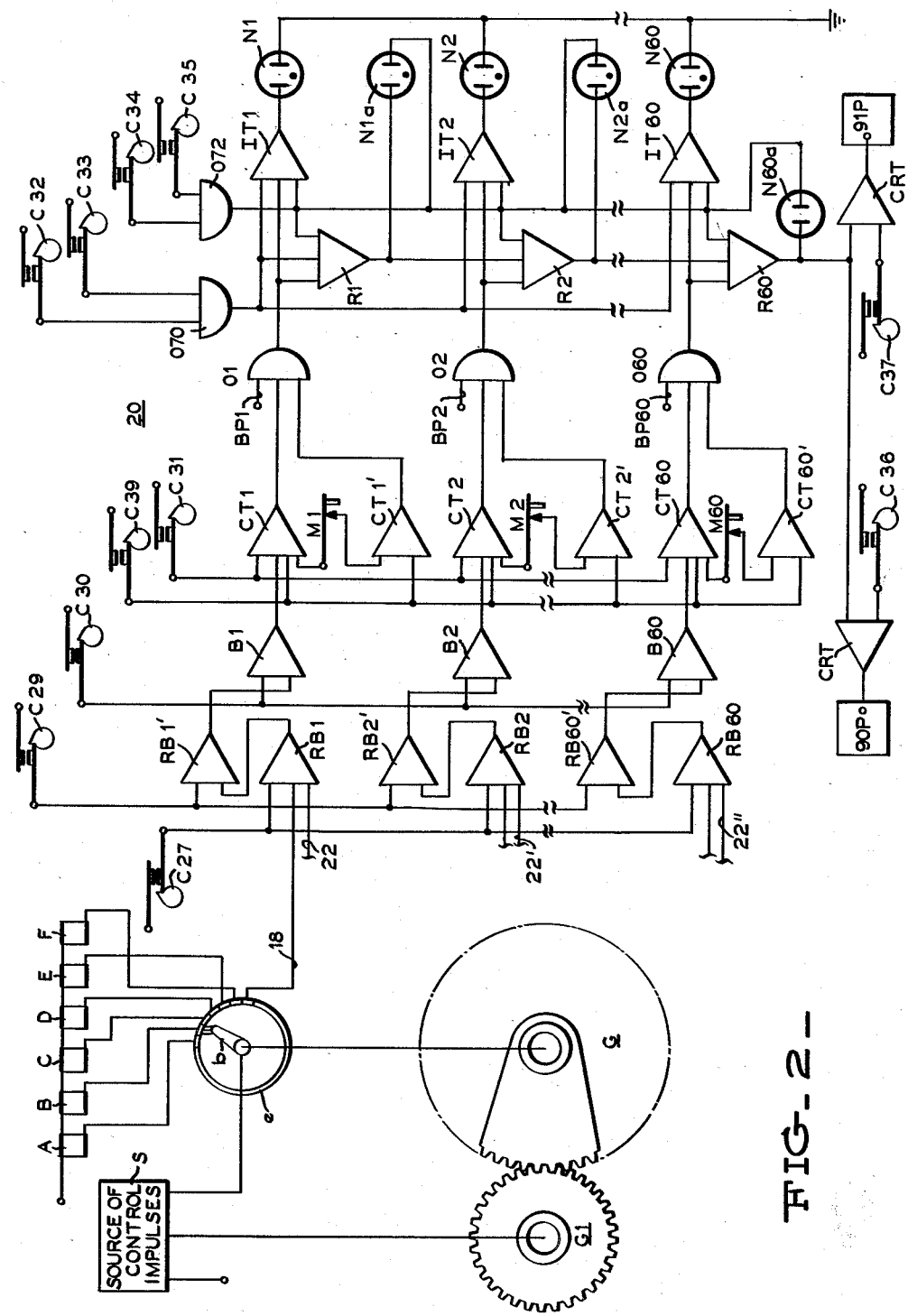

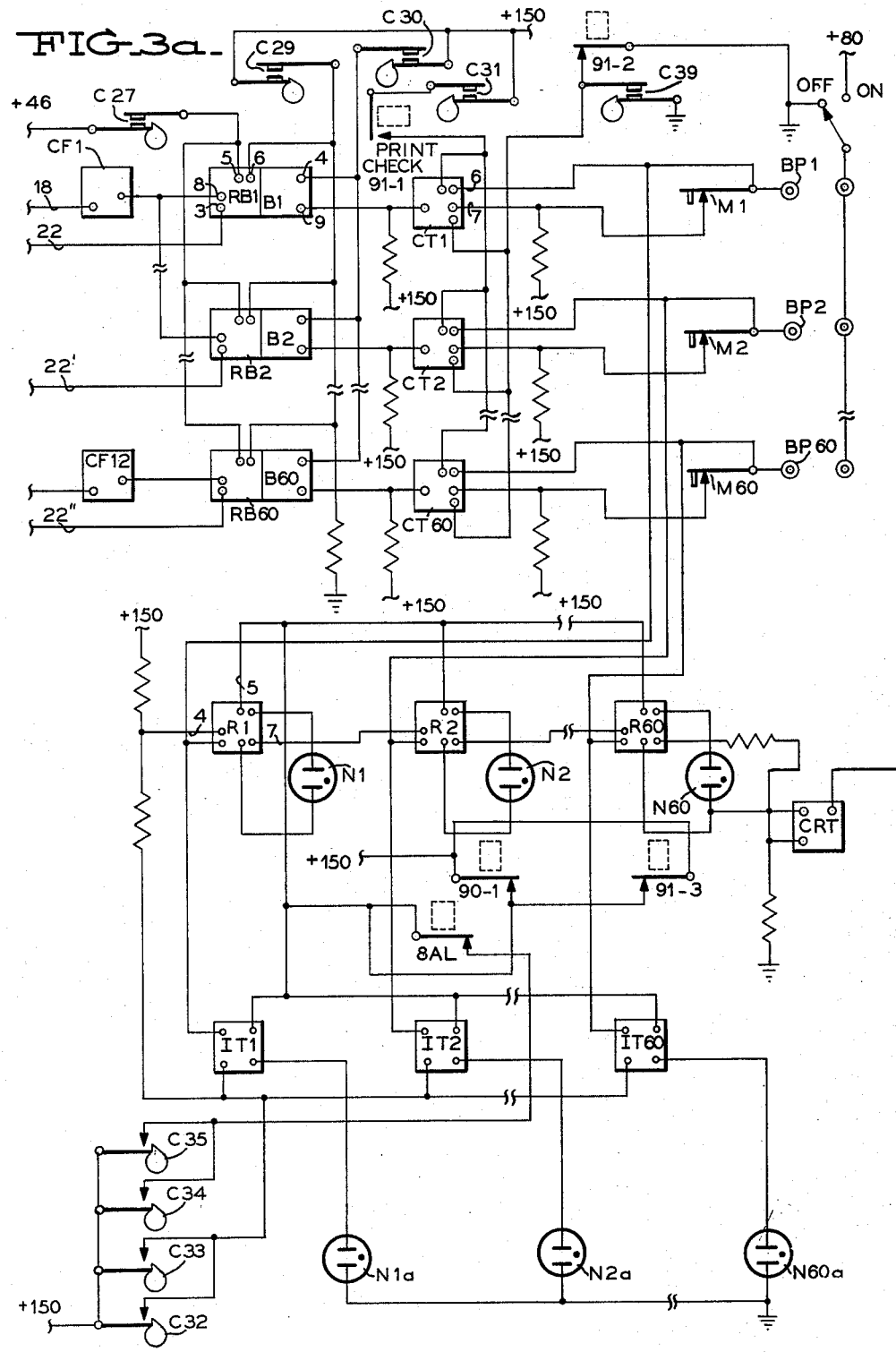

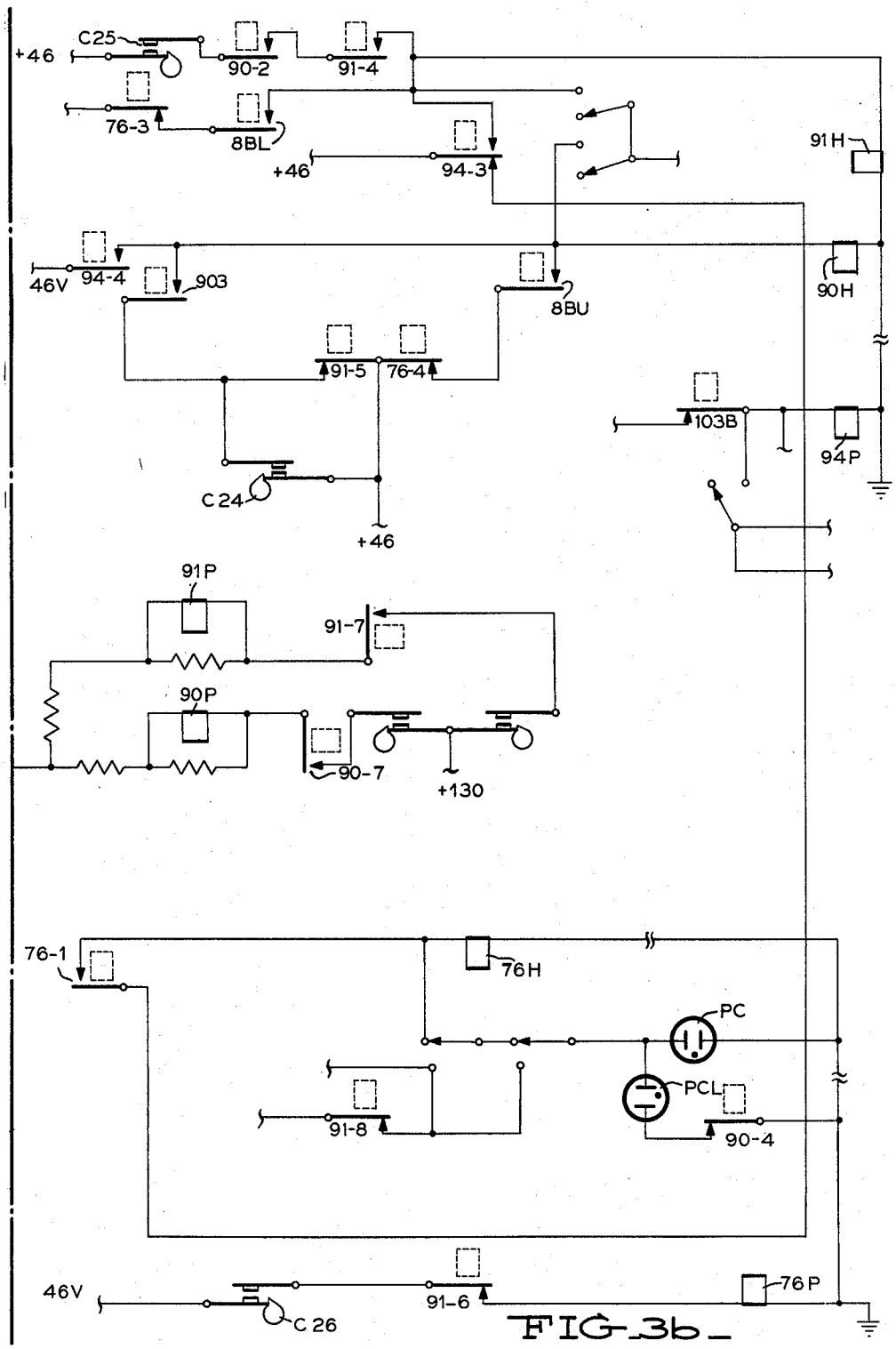

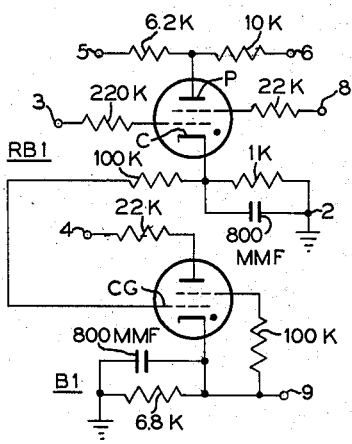
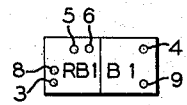
FIG_4a
FIG_4b_
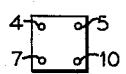
FIG_5a
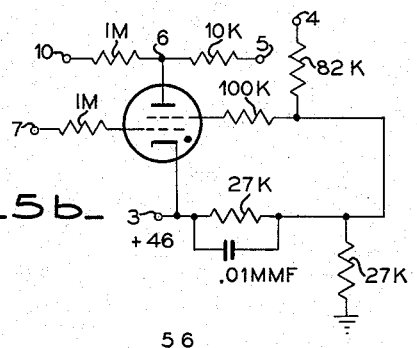
FIG_5b_
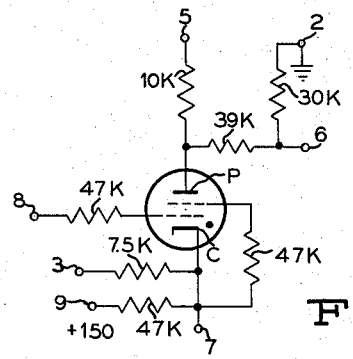
FIG_6a_
FIG_6b_
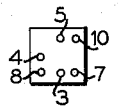
FIG_7a_
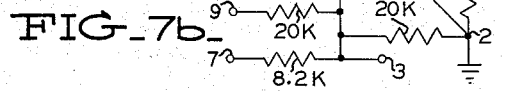
FIG_7b_

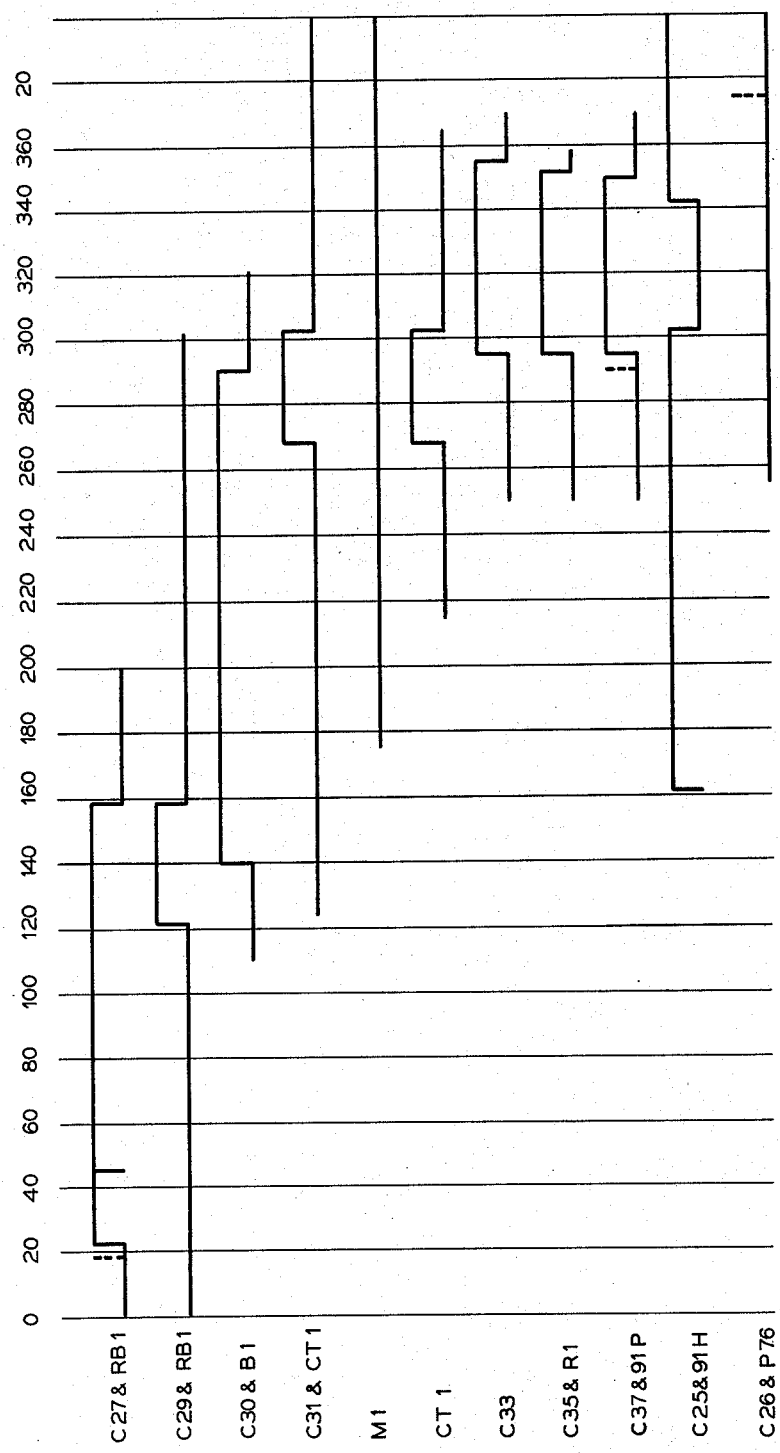

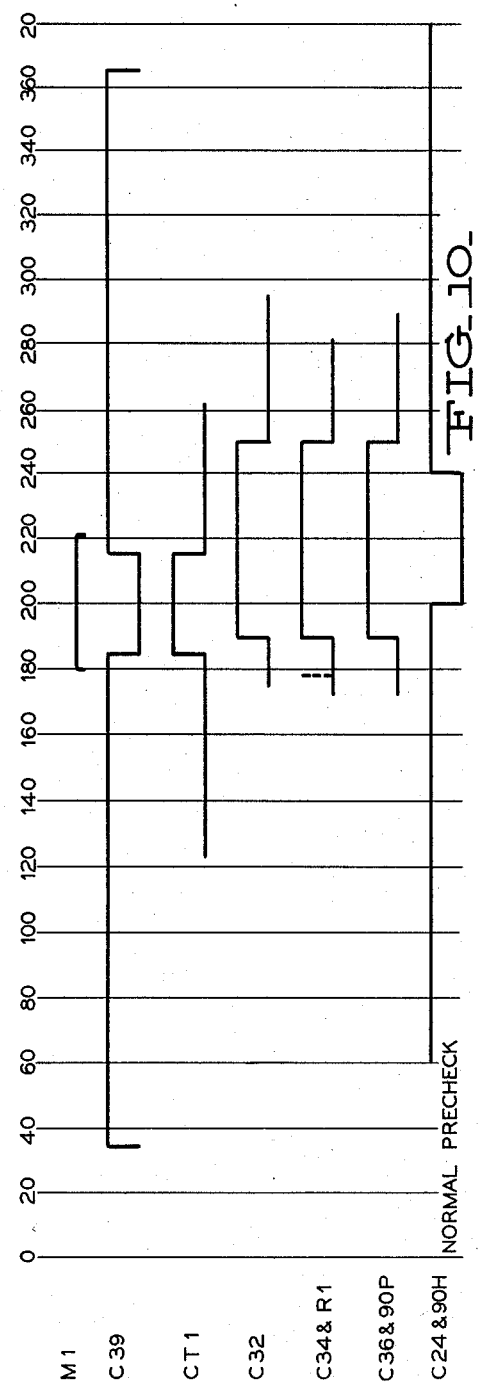
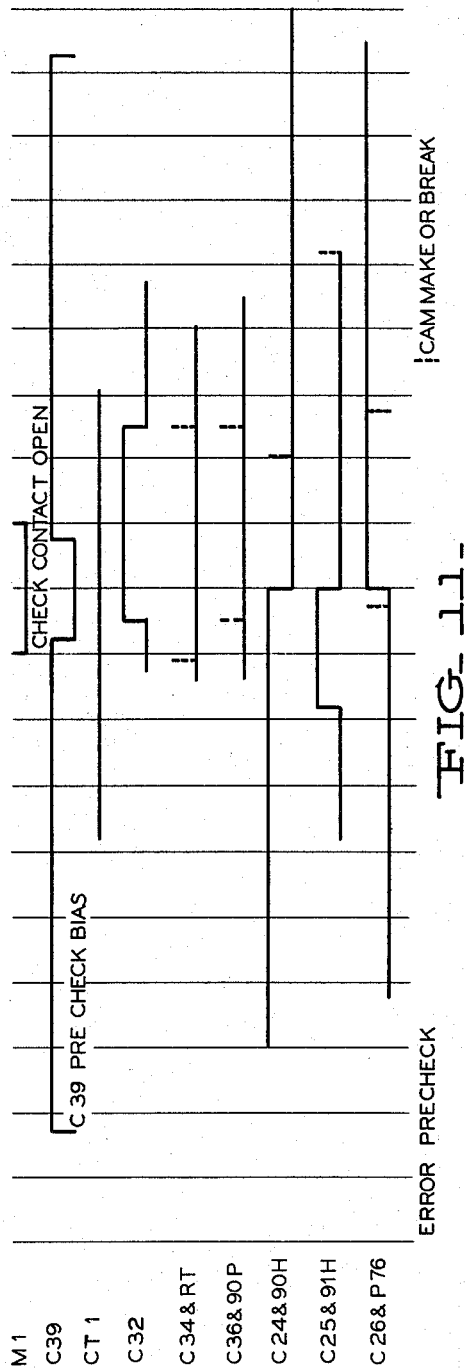

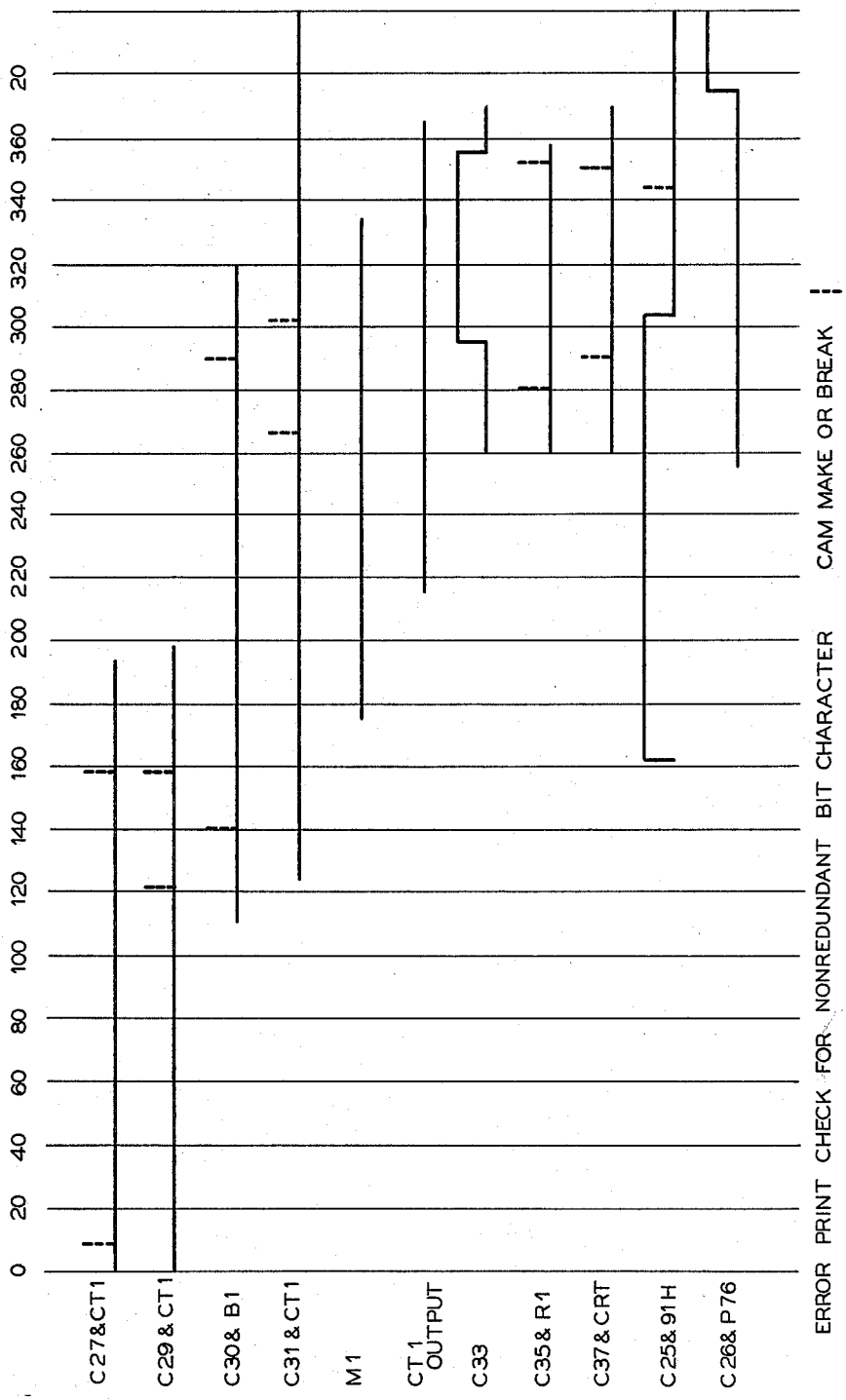

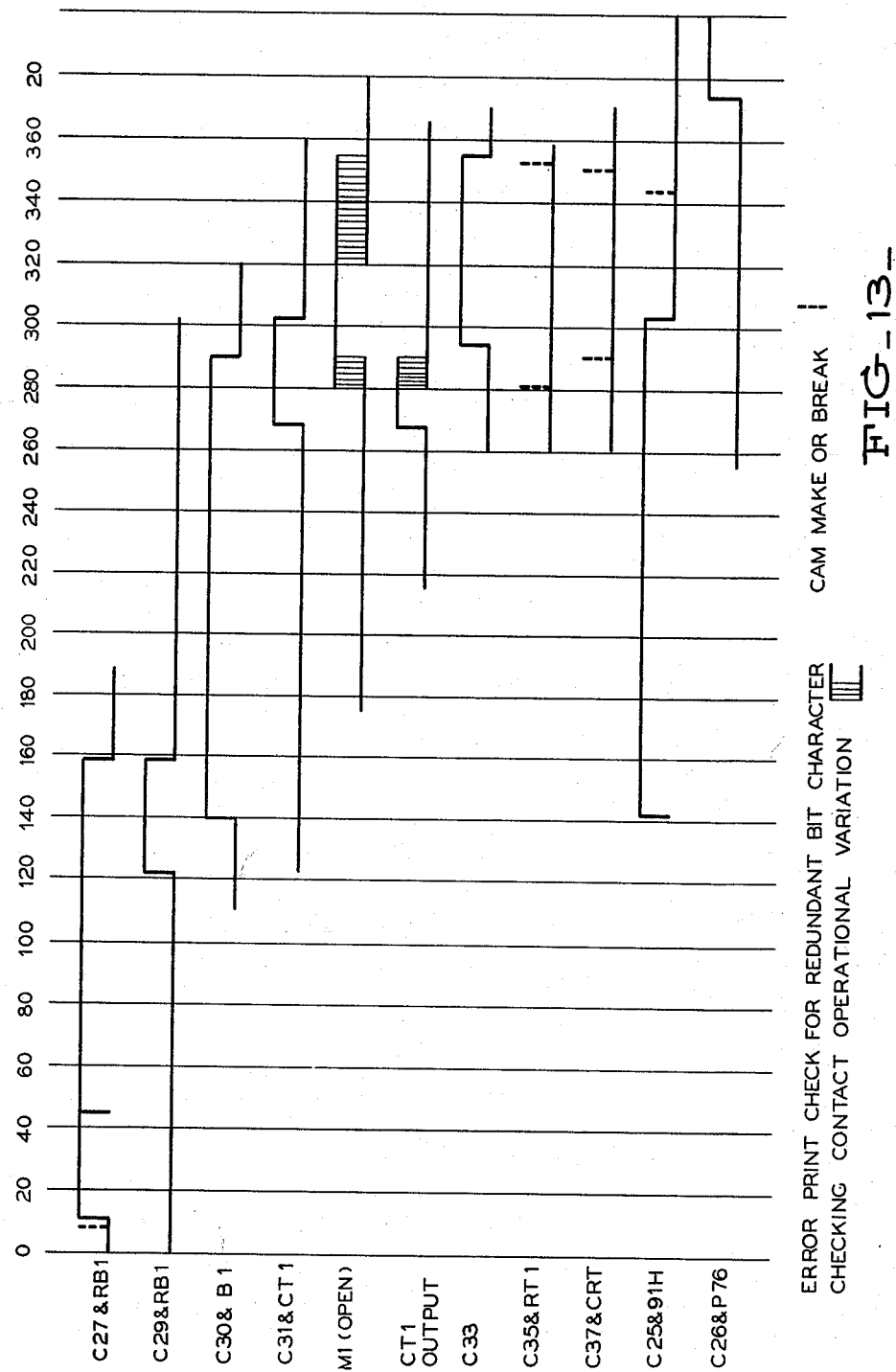

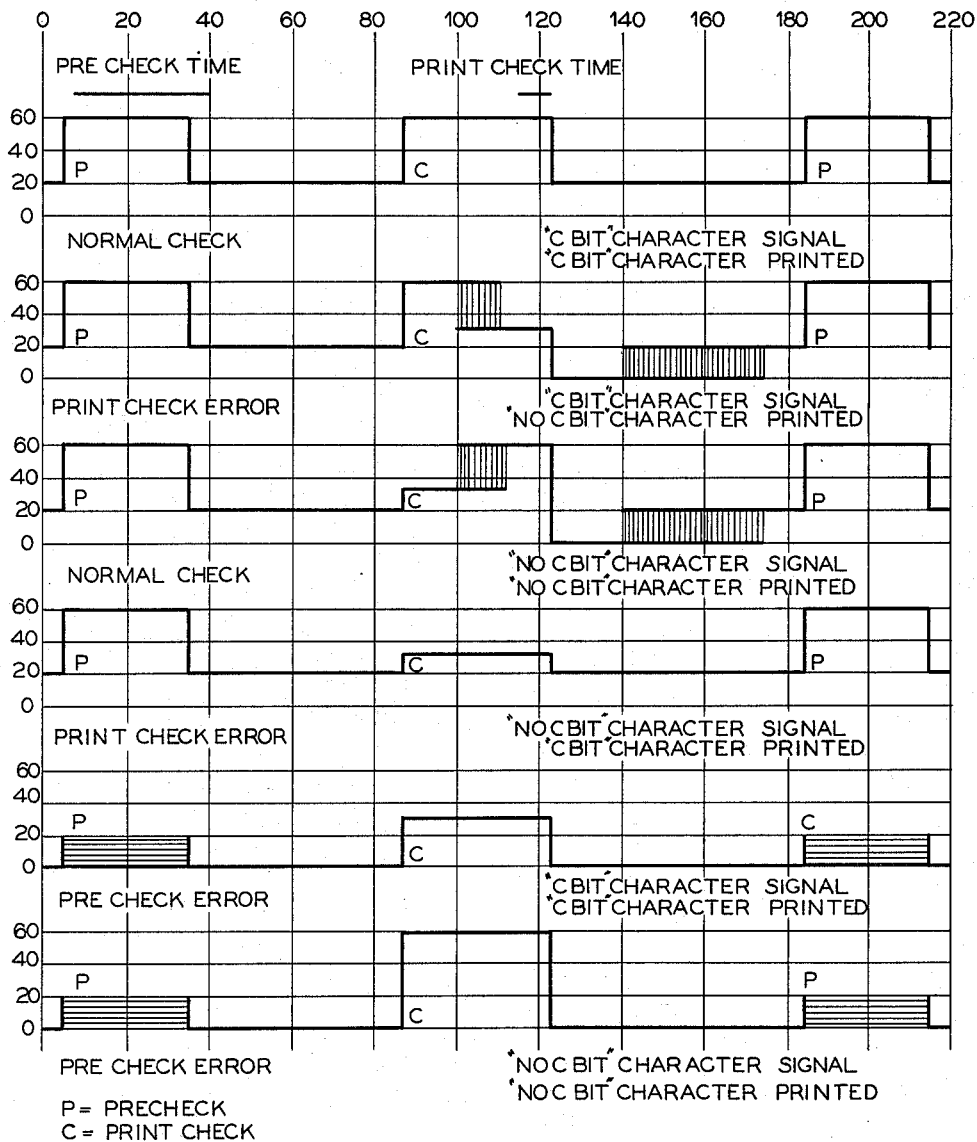
FIG_14_

United States Patent Office 3,110,884
Patented Nov. 12, 1963

1

3,110,884
WIRE PRINTER
Leon Scharff, Collingswood, N.J., assignor to International Business Machines Corporation, New York, N.Y., a corporation of New York
Filed Dec. 30, 1957, Ser. No. 706,168
10 Claims. (Cl. 340—146.1)

This invention relates generally to a print setup checking circuit and it has reference in particular to a logic print setup checking circuit.

Generally stated, it is an object of the invention to provide a self-checking print setup checking circuit.

More specifically, it is an object of the present invention to provide a logic print setup checking circuit wherein a redundant bit signal and check contact positions which are responsive to the position of a code rod are checked both serially and individually for each column of print by means of logic AND and OR circuits.

Yet another object of the invention is to provide for prechecking the condition of code rod check contacts in a wire printer before using them in making a print setup check.

It is also an object of the invention to provide for using with a code rod position-responsive checking contact in a wire printer, sensitive electronic check circuits which have been preset for a print setup check, and for prechecking the condition of the check contacts before an actual print setup check is made.

It is also another object of the invention to provide for pre-energizing thyratron AND circuits with a reduced plate voltage during coincidence of redundant bit and gating signals for subsequently increasing the plate voltage thereof to provide a predetermined output signal after the signals to be checked for coincidence have been removed.

Another important object of the invention is to provide for disabling a thyratron AND circuit, and for changing the plate and the cathode connections thereof so as to obtain a precheck output potential by means of a voltage divider action.

Yet another object of the invention is to provide in a multicolumn printing operation both a series check of a plurality of print setups, as well as an individual check which will indicate not only in which column the error occurred which caused stoppage, but also whether more than one print setup is in error.

According to the present invention, the presence of the redundant bit signal in the code for a particular character in each of a plurality of columns is used in conjunction with a gating signal for the particular column to trigger a logic AND circuit and produce an output signal which is applied through a buffer AND circuit to a following AND circuit which operates in conjunction with the position of check contacts operated by the code rod for the particular column to determine the validity of the code and produce a "go" signal.

Before this check is made, the check contacts are all checked prior to setup in each printing subcycle by disabling the aforesaid following AND circuit, and removing a normal ground connection so as to produce a sufficient precheck output signal by a voltage divider action, only if the check contacts are closed, which is their normal position.

Subsequently, plate voltage is applied to the following AND circuits and a comparison of the signals derived from the first-mentioned redundant bit AND circuits made with the respective check contact positions. If agreement is found, a print check relay, which would otherwise be de-energized, is maintained operative and a printing operation is effected.

The aforesaid following AND circuits are used in conjunction with corresponding serially related ripple AND circuits having one ripple AND for each column, so that the output signal from one ripple AND circuit is utilized to trigger the following ripple AND circuit. The print check relay cannot be maintained operated unless all of the ripple AND circuits provide output signals to indicate agreement in every column.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a partial view in longitudinal-vertical section of a wire printer embodying the invention, FIG. 2 is a schematic logic wiring diagram of a wire printer embodying the invention, FIGS. 3A and 3B, taken side by side, provide a schematic wiring diagram of the circuit elements of the logic circuit shown in FIG. 2, FIGS. 4A and 4B are block and detailed diagrams of the redundant bit and buffer AND circuits of FIG. 2, FIGS. 5A and 5B are block and circuit diagrams of the indicator AND circuits of FIG. 2, FIGS. 6A and 6B are block and circuit diagrams of the check AND circuits of FIG. 2, FIGS. 7A and 7B are block and circuit diagrams of the ripple AND circuits of FIG. 2, FIG. 8 is a timing chart illustrating a normal print check for a nonredundant bit character, FIG. 9 is a timing chart showing a normal print check for a redundant bit character, FIG. 10 is a timing chart for a normal precheck, FIG. 11 is a timing chart for an error precheck, FIG. 12 is a timing chart for an error print check for a nonredundant bit character, FIG. 13 is a timing chart for an error print check for a redundant bit character, and FIG. 14 shows oscilloscope pictures of the voltages at the stage by-pass plugboard for different operating conditions.

The invention has been shown as embodied in a wire printer of the type disclosed in the copending U.S. patent application Serial No. 478,787, filed December 30, 1954, now Pat. No. 2,829,593, issued April 8, 1958, of Donald K. Rex, entitled Wire Printer. As shown in FIG. 1, a code rod 11 is rotatably and slidably disposed on a laterally movable code rod return bail 15 by means of supports 15b and disposed to be rotatably positioned in any one of a plurality of positions by means of a gear and pinion 11a and 11b. Other suitable means (not shown) is provided for vertically positioning the tube in different ones of a plurality of positions. The rod 11 is provided with a plurality of openings 22, and when positioned in different vertical and rotational positions is disposed to be moved laterally against the ends of a plurality of print wires 12 by the bail 15 so as to move the wires longitudinally to impart a differential setting thereto prior to the subjection of the print ends of such wires to a printing impact, dependent upon whether the wires 12 are disposed opposite opening 22 in the rod 11 or not. A normally closed check contact such as M1 is provided in conjunction with each column and is actuated by an inertia slug 16 attached to an additional print wire 14 disposed to be selectively actuated by the code rod tube 11 depending on the particular position of the code rod tube for the character to be printed. The determination of whether or not the check contact M1 will be actuated depends upon the character of the code for the particular character to be printed. As set forth in the copending Rex application, if the character corresponding to the position in which the code rod 11 is disposed is designated by an odd number of impulses, no redundant bit is added thereto, and the rod should be positioned so that no low portion or hole will be disposed in the rod 11 so that it will be aligned with the additional wire 14. Thus, displacement of the additional wire will take place when the code rod is moved against the control ends of the print wires to preset them and contact M1 will be opened. On the other hand, if the character corresponding to the position in which the code rod tube was disposed is designated by an even number of impulses or bits, a redundant bit is added to make the total odd, and a hole is disposed opposite the end of the additional wire 14 so that it will not be actuated upon movement of the code rod against the print wires to preset them. Thus, if the character corresponding to the position of the code rod is designated by an even number of bits so that a redundant bit is added to make the total odd, the additional wire 14 is not displaced and contact M1 remains closed; if the number of bits is odd so that no redundant bit is used to make the total of bits odd, the wire 14 is displaced and contact M1 is opened. Hence, the wire 14 is not displaced when a redundant bit should have been present with the group of control impulses or bits on the basis of a character corresponding to the actual positioning of the code rod. Reset of the wires 12 and 14 is effected by upturned finger portions 15a which engage the inertia slugs to retract the wires when the bail is restored at the end of a print cycle, if they are not reset by the print impact.

The selective positioning of the code rod will be determined by a plurality of magnets A through F which are adapted to be energized by any one of six distinct electrical impulses or bits, the number of which in any code may range from one to five. Whenever the code comprises an odd number of bits, no redundant bit is added to the particular code for check purposes, so that the number of pulses in any code will always be odd. The actual presence or absence of a redundant bit may be checked for by the circuitry outlined in FIG. 2. As shown therein, means such as an emitter $e$ is provided to distribute the control impulses or bits originating from a source S which may be a magnetic tape, paper tape, punch card or the like. The reading of the tape, etc., may be synchronized with the sweep of the emitter brush $b$ at its conductive segments by a gear segment G which is operated to drive a corresponding gear G1 during that portion of a cycle as the brush sweeps by the conductor segments.

In using a six-position code to designate the different characters, the emitter brush $b$ would first sweep by the conductor segments electrically connected with the magnets A, B, C, D, E and F, which control the positioning of the code rod 11. The seventh pulse, if it exists, would be the check pulse or redundant bit which would be applied through conductor 18 to a logic check circuit designated generally by the numeral 20. The logic check circuit 20 comprises a first redundant bit AND circuit for each column of print, represented by AND circuits RB1 and RB2 through RB60, which check for coincidence between the redundant bit signals on their respective conductors 18 and a gating signal applied to the conductor 22 for the particular column, in timed sequence. Coincidence between these signals and timed operation of circuit breaker C27, which applies a reduced voltage produces output signals which are applied to second AND circuits RB1' through RB60' with full voltage from circuit breaker C29 to apply output signals to buffer AND circuits B1 and B2 through B60, which operate to delay the output signal until the next subcycle. The output signals from the buffer circuits B1 and B2 through B60 are applied to following AND check circuit CT1 and CT2 through CT60, which operate to produce "go" signals, dependent upon whether the AND circuit is triggered and whether the related check contacts M1 and M2 through M60 are opened or closed. The output signals from the check thyratron AND circuits CT1, etc., are applied to related OR circuits O1 and O2 through O60 from whence the output is applied to ripple AND circuit in conjunction with voltage from breakers C32 or C33 and to each of the AND circuits R2 through R60 in conjunction with the output of the previous AND circuit in a series ripple relation, as well as to indicator AND circuits IT1 and IT2 through IT60 individually. The indicator AND circuits are connected across neon indicator lights N1a and N2a through N60a, which are lit when breakers C32 and C33 close and are extinguished when their associated AND circuits are activated. Corresponding ripple neon lights N1 and N2 through N60 are associated with the ripple AND circuits and are disposed to be activated whenever plate voltage is applied to the associated AND circuits R1 and R2 through R60, and extinguished whenever the corresponding AND circuit such as AR1 is activated.

As shown in FIG. 2, each column is provided with a logic circuit arrangement such as described hereinbefore the circuitry for columns 1, 2 and 60 only being shown in order to simplify the diagram. It will be seen that the indicator AND circuits IT1, IT2 and IT60 are individually controlled from their respective check AND circuits CT1, CT2 and CT60. Accordingly, the indicating neons N1a, N2a and N60a will individually be extinguished if a "go" signal is received from the respective check AND circuit, and will be only if there should be a failure to receive the "go" signal from the particular column. The ripple AND circuits R1 and R2 through R60, however, are serially related, since an output signal is required from the ripple AND circuit R1 to trigger the following ripple circuit R2, and likewise the last ripple AND circuit R60 requires an output signal from the preceding ripple circuit R59 (not shown). Additional check AND circuits CT1' and CT2' through CT60' are provided for producing a check signal prior to print check time for operating the ripple and indicator AND circuits the same as during a print check. If "go" or check signals are received from each and every one of the check AND circuits, all of the ripple AND circuits will be triggered, and an output signal will be provided by the ripple AND circuit R60 to trigger the check relay thyratron AND circuit CRT for effecting operation of the precheck relay 90P and the print check relay 91P in timed relation, depending upon whether circuit breaker C36 or C37 is closed.

Referring to FIGS. 3A and 3B, it will be seen that the redundant bit signal from the emitter $e$ of FIG. 2 is applied to the redundant bit AND circuits RB1 and RB2 through RB60 by way of conductor 18 through cathode followers such as CF1 and CF12, this signal being applied from each cathode follower to a plurality of the AND circuits, while the gating signals for each column are applied individually through conductors 22, 22' and 22'' in timed sequence. If coincidence results, an output signal is applied to the buffer B1. As may be seen from FIGS. 4A and 4B, considered along with FIG. 3A, the redundant bit AND circuit RB1 comprises a cathode follower circuit wherein reduced plate voltage is first applied through terminal 5 to the plate $p$ of a gas discharge device through a circuit breaker C27 in conjunction with the coincidence pulses in order to pre-energize it, and full plate voltage is thereafter applied at terminal 6 through a circuit breaker C29 after the redundant bit and gating signals are removed in order to provide a sufficient output voltage at the cathode $c$ to render the buffer B1 conductive by applying a sufficient signal to the control grid $cg$ thereof, while plate voltage is applied by breaker C30 to the plate terminal 4. Values of the respective resistors and capacitors of a typical circuit arrangement are indicated on the drawing.

The application of a sufficiently high signal voltage to the control grid $cg$ of the buffer B1 will produce an output signal at terminal 9 which may be applied to the control grid terminal 8 of the check thyratron AND circuit CT1. As shown in FIGS. 3A and 6B, the code rod check contact M1 is connected between terminals 6 and 7 or between the plate tap and the cathode of the thyratron. Referring to FIGS. 6A and 6B in conjunction with FIG. 3A, it will be seen that the plate $p$ is normally connected to ground at terminal 2 through 39K and 30K resistors connected in series, as well as being connected to the plus 150 volt terminal of a source of plate voltage through a contact 91–1 of a print check relay 91 and circuit breaker C31. The cathode $c$ is connected to the plus 150 volt terminal through a 47K resistor at terminal 9 and is normally connected to ground at the number 3 terminal through circuit breaker C39 and through a parallel circuit including contact 91–2 of the print check relay 91. With the check contact M1 closed and the check thyratron CT1 fired, an output signal of plus 56 volts D.C. is provided at terminal 6 which is sufficient to trigger the first ripple thyratron R1. If the check contact M1 is open, the output signal from the AND circuit CT1 is derived from the plate circuit voltage divider, and this signal level of approximately plus 30 volts is inadequate to fire the ripple thyratron AND circuit R1. Thus, coincidence between the position of the code check contact M1 and the presence or absence of a redundant bit signal in the code controls the firing of the ripple thyratron. This is true for each of the columns.

Each ripple thyratron AND circuit such as R1 comprises, as shown in FIGS. 3A, 7A and 7B, a cathode follower arrangement of a gaseous discharge device, plate voltage being applied at terminal 5 through a machine latched relay contact 8AL and circuit breakers C34 and C35 precheck and print check time, respectively. Screen grid voltage is applied through circuit breakers C33 and C32 of first ripple thyratron R1 to terminal 4, the "go" signals from the check thyratrons such as CT1 are applied to the control grids of terminals 8, and output signals are derived at terminal 7 which is connected to the shield grid $sg$ of the following tube. Check neons N1, etc., are connected between terminals 10 and 3.

As shown in FIGS. 3A, 5A and 5B, the indicator AND circuits IT1 through IT60 each comprise a gaseous discharge device having plate voltage applied at terminal 5 through circuit breakers C34 and C35, respectively, with the "go" signals from the check thyratrons CT1 through CT60 being applied at the control grid through terminal 7. Plate voltage is provided through circuit breakers C34 and C35 and breakers C32 and C33 apply shield grid voltage at precheck and print check times, respectively. These thyratrons control the ripple and indicating neons N1 and N2 through N60, and N1a through N60a are each connected in shunt with the respective ripple and indicating thyratrons R1 and IT1, etc., and are turned on whenever either the circuit breaker C34 or the circuit breaker C35 closes to apply plate voltage at either precheck or print check time, respectively. Whenever one of the ripple or indicating thyratron AND circuits such as R1 or IT1 is triggered, it shunts its respective neon light N1 or N1a turning it off so that should an error occur, the neon lights may be scanned to determine which one or more of the columns was in error, since each of the columns indicating an error will have its neon light still lit.

An additional check is made on the operating condition of the circuitry by checking the check contacts M1 through M60 prior to a print check operation. This precheck operation is effected by disabling the check thyratron AND circuits CT1 through CT60 after the redundant bit AND circuits RB1 through RB60 may have been operated, and before the print check operation period. The check thyratron AND circuits CT1 through CT60 are disabled by the opening of circuit breaker C31, which removes plate voltage from the AND circuits, and the opening of circuit breaker C39 to disconnect the cathode from its normal ground connection. It is immaterial whether or not the check thyratron AND circuit may have been previously conditioned for firing, since precheck output is dependent solely on the condition of the check contacts M1, etc., the purpose being to check to see that the check contacts M1 through M60 are closed as they should be at this time. With the check contact such as M1 closed, an output voltage will be derived from the output terminal 6 of about 58 volts because of the connection of the terminal 6 by the contact M1 to the cathode at terminal 7, and the connection of terminal 9 to the plus 150 volt terminal of the source. This output voltage is adequate to trigger both the ripple thyratron AND circuits R1 through R60, and the indicator AND circuits IT1 through IT60. Should any one of the check contacts M1 through M60 be open, the output terminal 6 will be disconnected from the source, and no output voltage will be available, so that the respective ripple AND circuit and indicator AND circuit will not be turned on. Accordingly, the indicating neons for the particular circuits having open contacts will remain on, and no output signal will be derived from the ripple AND circuit R60, and accordingly, the print check thyratron AND circuit CRT will not be turned on. The precheck relay 90P will not be maintained energized so that contact 90–2 opens and drops 91, and contacts 91–6 close to effect energization of the print error relay 76–P, which operates to stop the machine in the next subcycle. The precheck lamp PCL and the print check lamp PC will be turned on by closing of contacts 90–4 and 76–1.

When power is turned on, the temporary make of relay 94 via contacts 103–B initially allows the pick of relay 90 through coil 90H via contacts 94–4 and relay 91 through coil 91–H via contacts 94–3. Prior to the dropping out of relay 94, machine relay 8 makes. This in turn locks in relay 90 through coil 90H via contacts 8BU, 76–4, and relay 91 through coil 91H via contacts 8BL and 76–3. The make of relays 8, 90 and 91 keeps the print check neon lamps de-energized via contact 8AL, 90–1 and 91–3.

When the machine starts, relay 8 drops out at approximately 50 degrees A circuit breaker time. At this time, relay coil 91H is held energized via circuit breaker C25 and contacts 91–4, 90–2, and relay coil 90H is held energized via circuit breaker C24 and contacts 90–3. Relay coil 91H is held in while normal print setup checking occurs through relay coil 91–P.

During running, the machine latch relay 8 and print check error relay 76 remain in an unenergized state, providing that print check relay 91 and precheck relay 90 are constantly picked and held in. Under these conditions, the machine that stays in operation and the print setup checking circuit functions properly. Contacts 91–7 and 90–7 are provided for isolation purposes in the 91P and 90P coil circuits.

Referring to FIG. 10, it will be seen that for a normal precheck, a check thyratron AND circuit such as CT1 is disabled at approximately 184 degrees, and if the check contact M1 is closed, a 58 volt signal will be developed at the cathode of the thyratron AND circuit CT1, which is applied to the control electrode of the first ripple thyratron R1. Circuit breakers C34 and C32 close to apply plate and shield grid voltage, respectively, to the ripple thyratron AND circuits R1 through R60 and the indicator thyratron AND circuits IT1 through IT60. AND circuit R1 is triggered and applies an output voltage to the following AND circuit R2 of the ripple circuit which likewise receives an output signal from its check thyratron AND circuit CT2, provided that the contact M2 is closed. This check operation proceeds with each ripple thyratron R2 through R60 being triggered by a signal from the preceding AND circuit provided the check contacts are all closed. In the event that a check contact is not closed, its respective AND circuit will not be triggered. Since the application of plate voltage to the ripple thyratron AND circuits also applies this voltage to the respective neon lamps N1 through N60, the neon lamp of the first ripple thyratron AND circuit, whose check contact is not properly closed, will remain lit. At the same time, plate voltage and output signals from the respective check thyratron AND circuits are being applied to the indicator thyratrons IT1 through IT60 individually, so that the neon lamps N1a through N60a will be turned on when plate voltage is applied and turned off whenever their respective AND circuits are triggered. The condition of the respective check contacts may thus be determined for each and every one of the columns by reference to the indicating neon lamps N1a through N60a. For the normal precheck condition being considered, operation of the ripple circuit comprising the AND circuits R1 through R60 will effect operation of the check relay thyratron CRT, thus effecting energization of the pick coil 90P of the precheck relay 90, when circuit breaker C36 closes at approximately 190 degrees. The opening of circuit breaker C24 at approximately 200 degrees interrupts the energizing circuit for the holding coil 90H of the precheck relay, but the precheck relay remains in the energized position because of energization of the coil 90P.

Referring to FIG. 11, it will be seen that for an error precheck condition, the check contact M1 is considered to be open. Accordingly, when circuit breaker 39 opens to remove the ground connection from the check thyratron AND circuit CT1, no output signal is developed, and accordingly, the ripple thyratron AND circuit R1 will not be triggered. Accordingly, the neon lamp N1 will be lit when the circuit breaker C34 closes to apply plate voltage to the thyratron AND circuit R1, and will remain lit since the AND thyratron circuit R1 is not triggered. Accordingly, the check relay thyratron CRT will not be energized, and the pick winding 90P of the precheck relay 90 will not be energized when the circuit breaker C36 closes. Thus, when circuit breaker C24 opens, the hold winding 90H of the precheck relay will be de-energized, and the precheck relay will return to the de-energized condition. The opening of relay contacts 90–2 causes relay 91 to drop out. This in turn will cause the print check error relay 76 to pick via contacts 91–6. Contacts 90–1 and 91–3 hold voltage on the indicating neons. The precheck lamp PCL is thus lit, and the print check relay 91 operates to stop the machine.

Referring to FIG. 8 which is a timing chart for a normal print check for a nonredundant bit character, it will be obvious that the redundant bit AND circuit, for example RB1, will not be triggered when C27 and C29 close, owing to the absence of a redundant bit. Accordingly, the check thyratron CT1 will not be fired when the circuit breaker C31 closes. With the check contact M1 open, as it should be for a character not having a redundant bit, an output signal will be developed by reason of the plate voltage divider circuit, sufficient to trigger the ripple thyratron AND circuit R1 whenever the circuit breakers C35 and C33 close during print check time. Satisfactory operation of the ripple AND circuits results in operation of the check relay thyratron AND circuit CRT so as to effect energization of the winding 91P of the print check relay when the circuit breaker C37 closes. Accordingly, contact 91–6 will be open, and the print error relay 76 will not be energized when circuit breaker C26 closes and operation of the machine will continue.

From FIG. 9, it will be seen that with a redundant bit character, the redundant bit thyratron RB1 will develop a reduced voltage output when circuit breaker C27 closes to apply reduced plate voltage thereto. The full output voltage will be developed at approximately 120 degrees when circuit breaker C29 closes to apply full plate voltage. The signal thus developed is sufficient to trigger the buffer thyratron AND circuit B1 when circuit breaker C30 closes to apply plate voltage thereto. This results in triggering of the check thyratron AND circuit CT1 when circuit breaker C31 closes at approximately 266 degrees. Since the character has a redundant bit, the check contact M1 will be closed, and a sufficient output signal is developed by the check thyratron AND circuit CT1 to fire the first ripple thyratron AND circuit R1 whenever circuit breakers C35 and C33 to close to apply plate and shield grid voltage thereto, respectively. The different columns are checked in succession, and satisfactory operation of the ripple circuit results in operation of the check relay thyratron AND circuit CRT, resulting in energization of the pick winding 91P which holds relay 91 in during the time that the hold winding 91H is de-energized by the opening of circuit breaker C25. Accordingly, contact 91–6 remains open and the print error relay 76 is not energized when circuit breaker C26 closes, so the machine closes, so the machine continues to operate.

If an error occurs during the print check for a nonredundant bit character, the check contact M1 will be closed and no output signal will be obtained from the check thyratron and CT1. Accordingly, even though circuit breakers C35 and C33 close to apply plate and shield grid voltage, respectively, to the ripple thyratron AND circuits, no output signal is obtained therefrom, and the check thyratron relay AND circuit CRT will not be triggered. When circuit breaker C25 opens, the hold coil 91H of the print check relay 91 will be de-energized, and since the pick coil 91P is not energized, relay 91 becomes de-energized. Contact 91–6 closes and completes and energizes a circuit for the print error relay 76P when circuit breaker C26 closes.

Referring to FIG. 13, it will be seen that in an error print check for a redundant bit character, a "go" signal is generated by the redundant bit AND circuit RB1, for example, which results in firing of the buffer AND circuit B1. However, due to the check contact M1 being in the open position, only a reduced output signal is derived from the check thyratron AND circuit CT1, which is insufficient to fire the ripple thyratron AND circuit RT1 when circuit breakers C35 and C33 close to apply plate and shield grid voltage thereto, respectively. Accordingly, the check relay thyratron AND circuit will not be triggered when circuit breaker C37 closes, and a circuit for the pick winding 91P of the print check relay 91 will not be completed when circuit breaker C37 closes. Accordingly, when circuit breaker C25 opens to de-energize the hold winding 91H, relay 91 drops out, stopping the machine, and closes contacts 91–6 so as to effect energization of the print error relay 76 when circuit breaker C26 closes, thus giving an error indication.

From the above description and the accompanying drawings, it will be seen that there has been provided in a simple and effective manner means for checking the accuracy of the printer. The condition of the check contacts is prechecked prior to making a print check error in order to eliminate errors due to faulty contact conditions alone. Errors due to improper positioning of the code rod in relation to the nature of the character indicated by the code received are thus more readily detected. Since the operating conditions of the plurality of columns are checked both serially and individually, not only is it assured that the conditions of the machine are proper, but in the event that there should be a faulty condition, operation of the machine is stopped as soon as possible, and yet the indicating neons indicate the individual conditions for all of the columns. While the invention has been described for an arrangement in which an odd redundancy and a normally closed check contact are used, it will be apparent that an even redundancy and normally open check contact, or different combinations of these arrangements may be used instead and still retain the principles of the invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In printing apparatus wherein a plurality of movable code rod elements are selectively actuated to one or the other of two positions in accordance with the presence or absence of a particular signal in electrical signals controlling the positions of the elements, a first means operable under the control of each element to produce a check signal in response to correspondence of the position of each code rod element with the electrical signal controlling said element, and a second means operable to check the correspondence of the positions of all the code rod elements with their associated signals, said second means comprising a series ripple coincidence circuit having a plurality of cascade related check means connected to be individually operated by said associated check signals cooperative to produce an additional check signal only in response to a check signal from every one of the first means.

2. In apparatus wherein a plurality of character defining rod elements are selectively actuated to one or another of a plurality of positions by coded signals some of which contain an added check signal, switch means individual to each code rod element operated thereby to one position or the other dependent on actuation of the code rod element to a position requiring a coded signal with an added check signal or not, check means individual to each code rod element operable under the control of the check signal and switch means to produce a signal upon coincidence of the added check signal and corresponding switch position, and a coincidence circuit comprising a plurality of additional check means associated one with each of the aforesaid check means, said additional check means being connected in cascade with each other to respond to coincidence of signals from an associated check means and with the exception of the first one a signal from a preceding additional check means.

3. In printing apparatus wherein a plurality of character defining code rod elements are selectively actuated to one or the other of two positions by electrical signals in accordance with the presence or absence of a particular signal in the electrical signals controlling the positions of the elements, an AND circuit individual to each element having on and off conditions connected to produce an output signal in response to said particular signal, a switch operated to one or the other of two different positions by said element in accordance with the position of the element, and circuit means including said AND circuit and said switch connected to provide an output signal upon coincidence of the switch position and AND condition for either one of the element positions.

4. In printing apparatus wherein a plurality of code rod elements for determining the nature of characters to be printed are selectively actuated to one or the other of two positions by electromagnetic means in response to electrical signals in accordance with the presence or absence of a particular signal therein, a first logic circuit means operable to either of two conditions so as to produce a check signal in response to the presence of said particular signal and none in the absence thereof, switch means operated by each of the code rod elements to one or the other of two positions depending on whether the code rod elements are operated to a position requiring the particular signal or not, and circuit means connecting said switch means and said first logic circuit means to provide an output signal when the switch means is positioned in accordance with the condition of the first means regardless of whether said first means operates.

5. In a printing machine, means including a plurality of character defining code rod elements, selectively actuable by electrical signals for representing characters by groups of signals some of which may and some of which may not contain signals which indicated the nature of the group, an AND circuit connected to be conditioned by signals which indicate the nature of the group to produce an output signal, switch means each selectively conditioned by movement of one of said elements in accordance with other signals of a group to indicate the nature of the group which should have conditioned it, and additional AND means connected to be jointly conditioned by the first AND means and the position of the switch means upon agreement in their indication of the natures of the group.

6. In a printing machine wherein a plurality of code rod elements for representing characters one for each column are respectively actuated by even and odd groups of signals and an extra bit signal is associated with the even or odd groups to make all groups odd or even, an AND circuit for each column connected to be selectively conditioned for an output by said bit signals, switch means for each column operated by its element in accordance with the character designating signals of each group, an additional AND circuit for each column conditioned by the output from the aforesaid AND circuit, a plurality of AND circuits one for each column, and circuit means including said switch means connecting said plurality of AND circuits in cascade for applying a signal from one to the other when the condition of the AND circuit for each column and the associated additional AND circuit agree.

7. In a printing machine having a plurality of movable code rod elements for representing characters under the control of a group of signals of which some are indicative of the nature of the group, operating means for each element conditionable according to some of a group of signals to indicate the nature thereof, another element associated with and controlled by each of the aforesaid plurality of elements conditionable according to other signals of the group and indicating the nature of the group which should have conditioned it, circuit means connected for comparing the correspondence of indicated conditioning between the each of said aforesaid and said another elements and for indicating the presence or absence thereof, means for prechecking the initial condition of each of said another elements before it is thus conditioned, and control means responsive to said indicating means for affecting operation of the machine.

8. In a cyclically operated printing machine, control means selectively operable for representing characters under the control of groups of signals of which some are and some of which are not indicative of the nature of the group, a character defining code rod element conditioned in each cycle under the control of said control means according to some of a group of signals to indicate the nature thereof, a second element controlled by said first element having a predetermined initial condition conditionable in each cycle according to other of the signals of the corresponding group and indicating the nature of the group which should have conditioned it, circuit means connected with the second element to apply a signal to precheck the initial condition of said second element in each cycle prior to conditioning and affect operation of the machine if the initial condition is not said predetermined one, and logic means connected for comparing the correspondence of indicated conditioning between the two elements and for indicating the presence or absence thereof.

9. In a printing machine, magnetic means selectively operable for representing characters by groups of signals some of which are indicative of the nature of the group, movable means including a code rod controlled by said magnetic means to form the character represented by said signals, a first means comprising a gas discharge device having an output circuit and an input circut connected to respond to some of the signals to indicate the nature thereof, a second means including a switch actuated by the code rod according to other of the signals of those groups and indicating the nature of the group which should have conditioned it, and circuit means connecting the first and second means for comparing the correspondence of indicated conditioning between the first and second means including a voltage divider and said switch means connected to the output circuit of the discharge device to produce an output signal only if the indications are alike.

10. In a printing machine, code rod means selectively operable by electrical signals for representing characters by groups of signals some of which are indicative of the nature of the group, a first gate means comprising a gas discharge device having an anode connected to a source of electrical energy, a cathode and a control electrode connected to be energized in accordance with said some of the signals for conditioning the device to indicate the nature thereof, a second cyclically operable switch means conditioned by said selectively operable code rod means according to others of the signals of the groups, switch means actuated by the second means to one position or another to indicate the nature of the group which should have conditioned said second means, and circuit means including a voltage divider and said switch means connected between the anode and cathode to provide a predetermined output signal only if the indications are alike.

References Cited in the file of this patent

UNITED STATES PATENTS

| | | |
|---|---|---|
| 2,672,601 | Welby | Mar. 16, 1954 |
| 2,700,755 | Burkhart | Jan. 25, 1955 |
| 2,857,100 | Franck et al. | Oct. 21, 1958 |
| 2,909,995 | Hannibal | Oct. 27, 1959 |